T. M. HOUSE AND H. R. McCONNELL.
TRUNK RIVETING MACHINE.
APPLICATION FILED JULY 14, 1920.
1,430,447.
Patented Sept. 26, 1922.
7 SHEETS—SHEET 4.
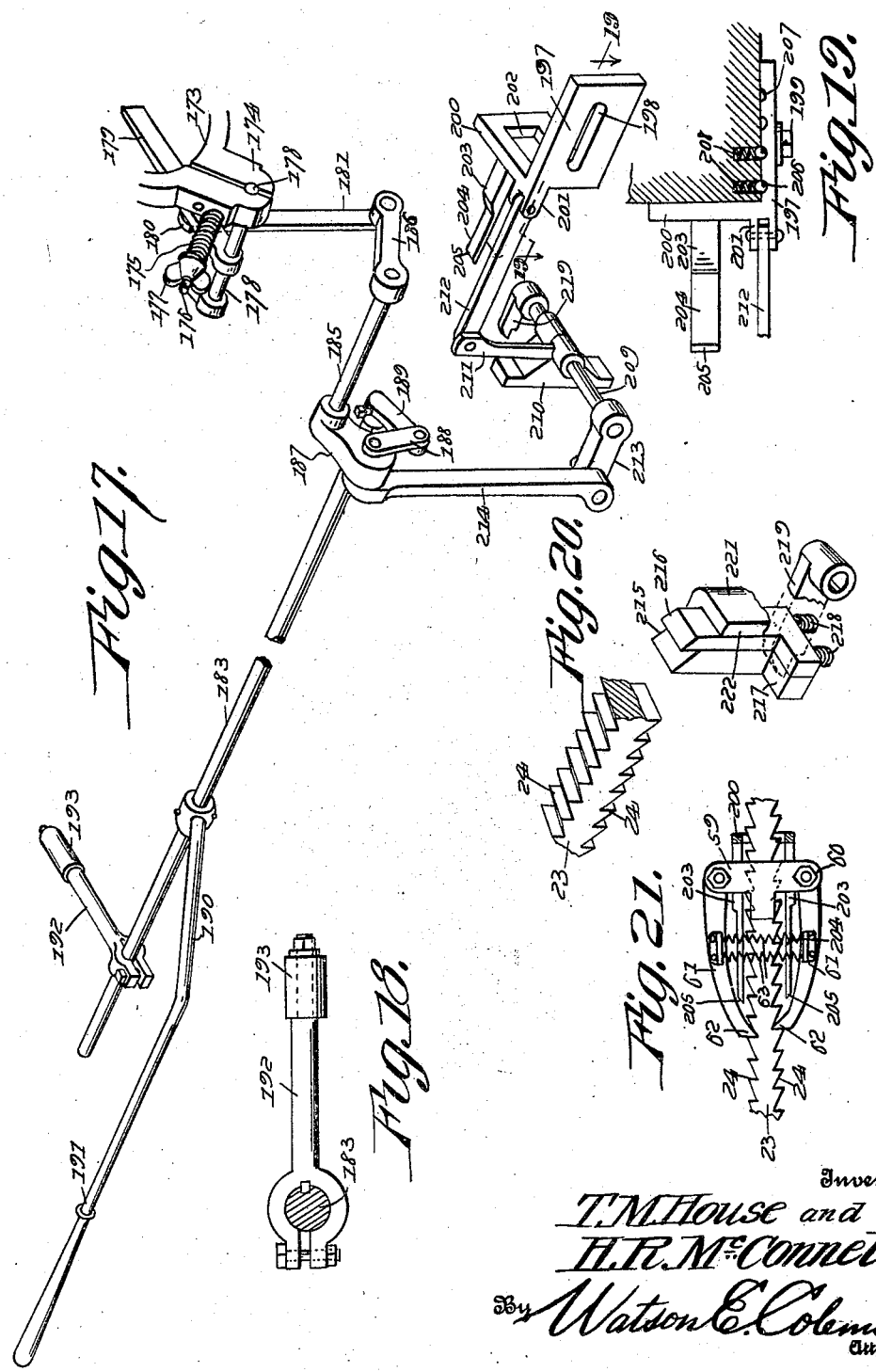

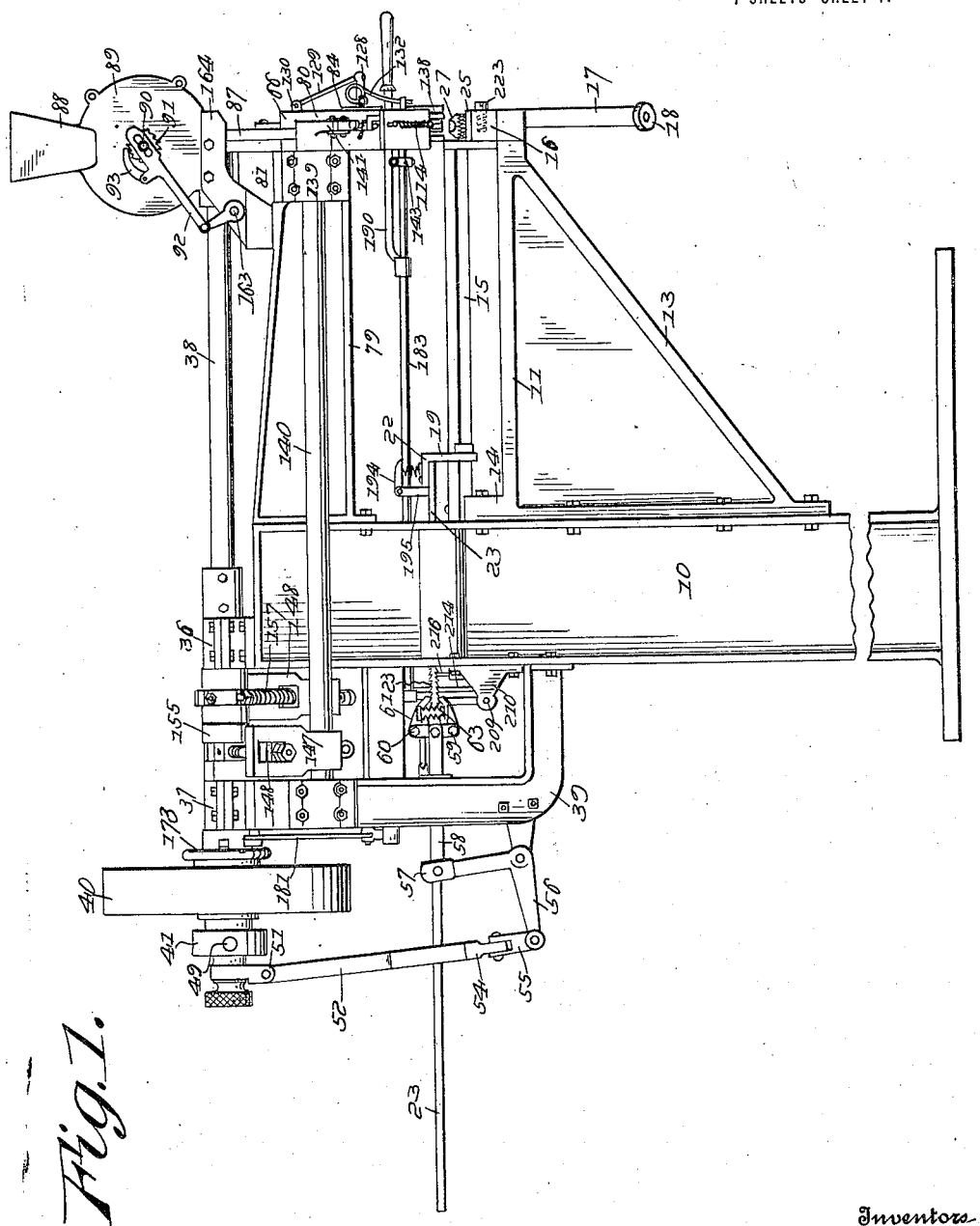

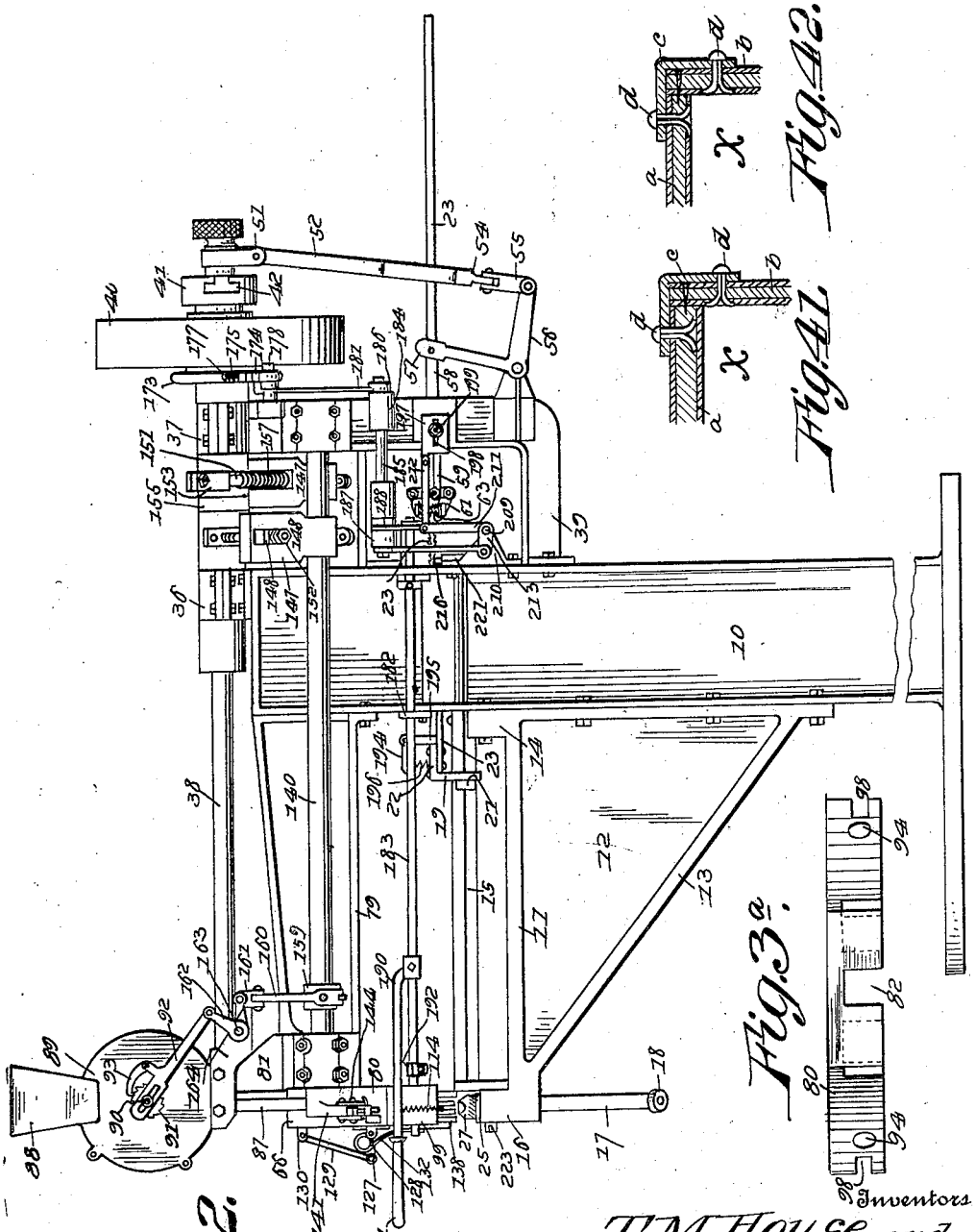

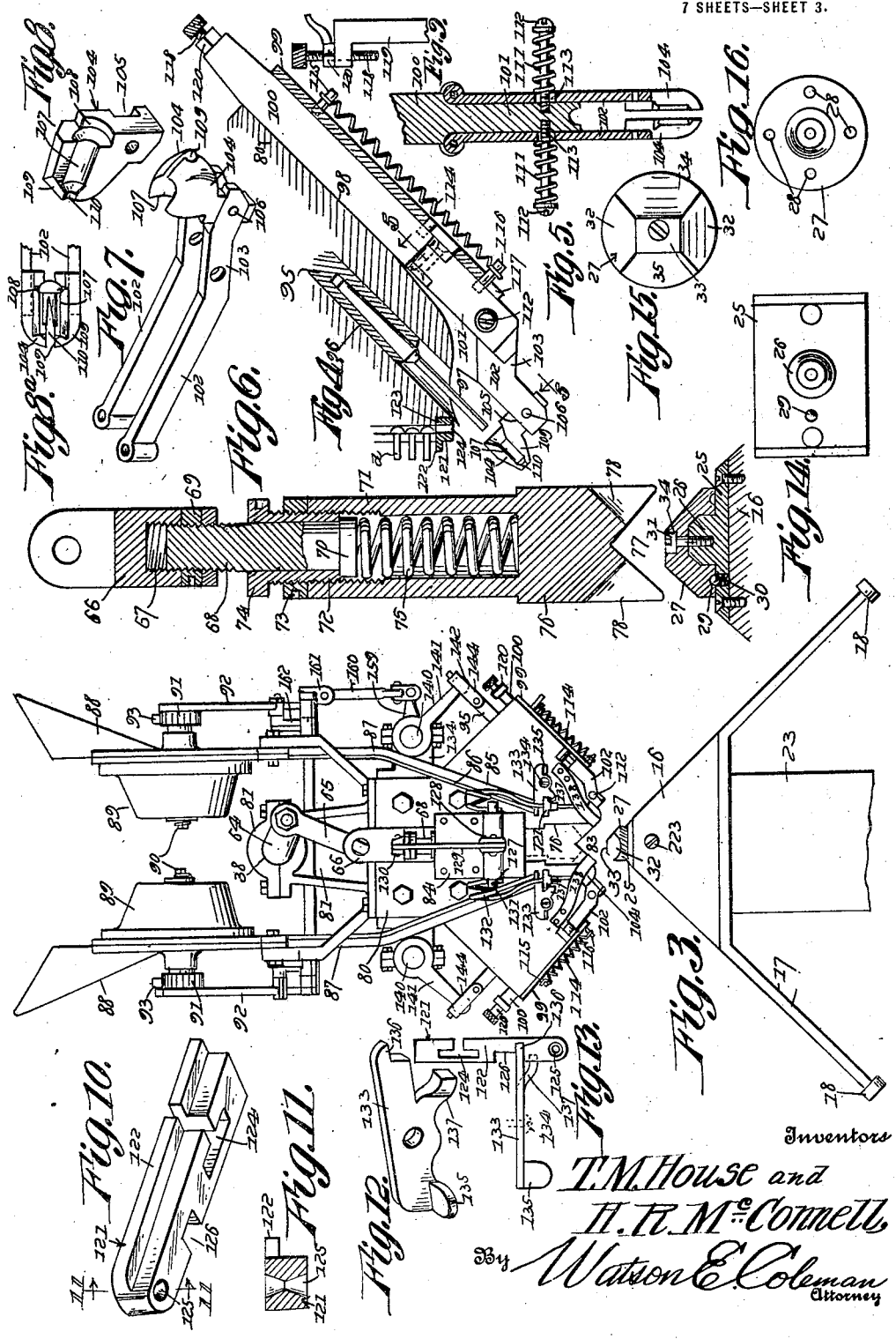

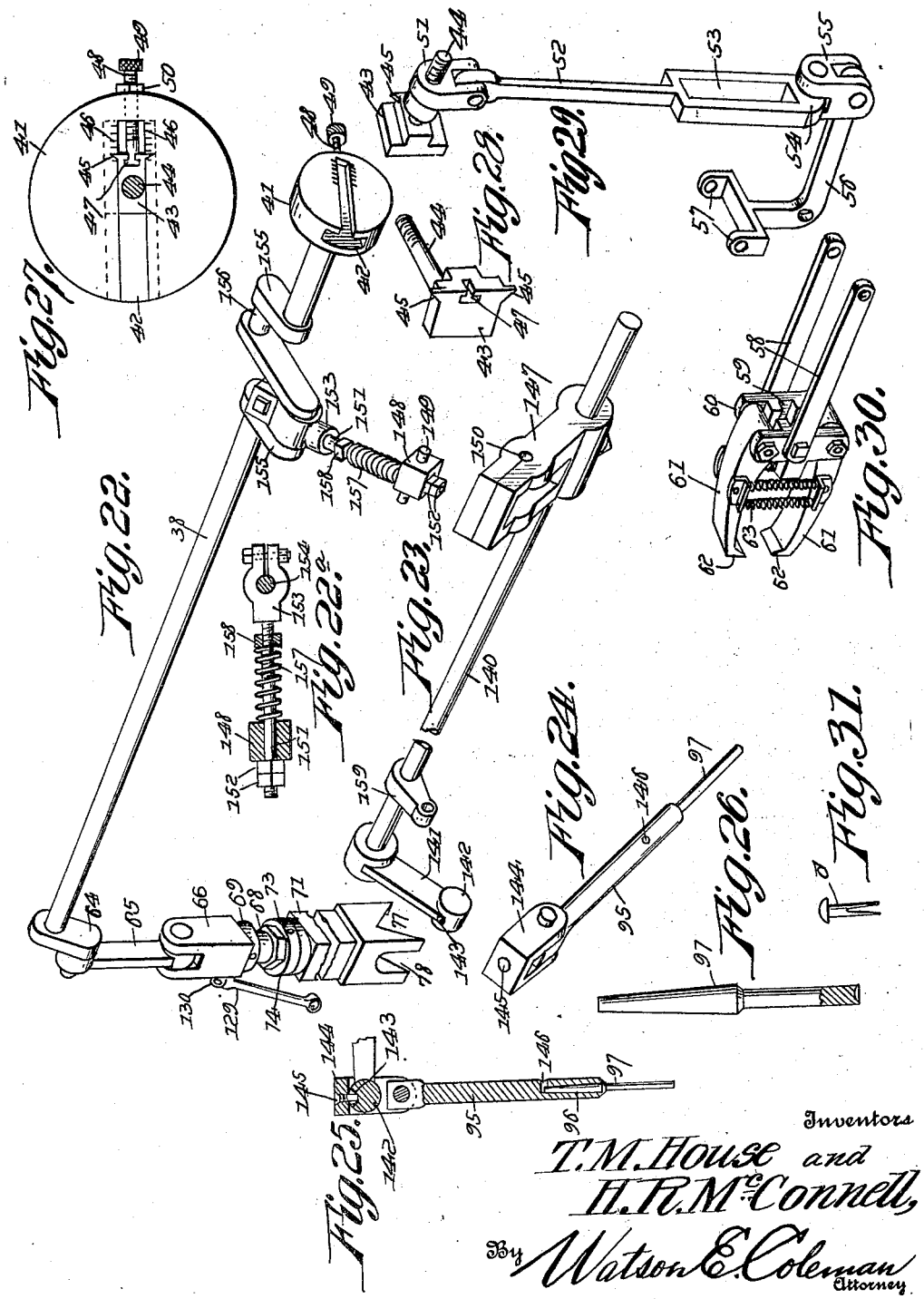

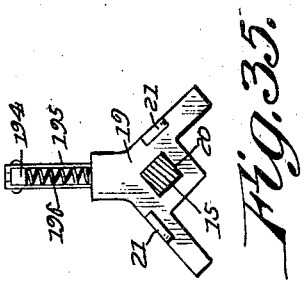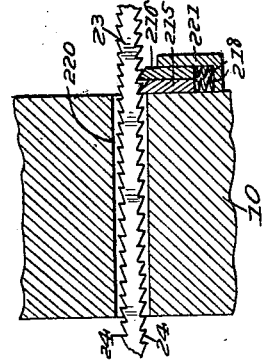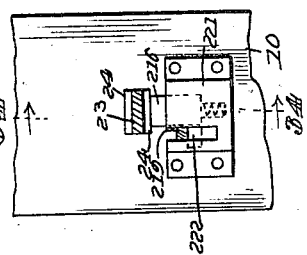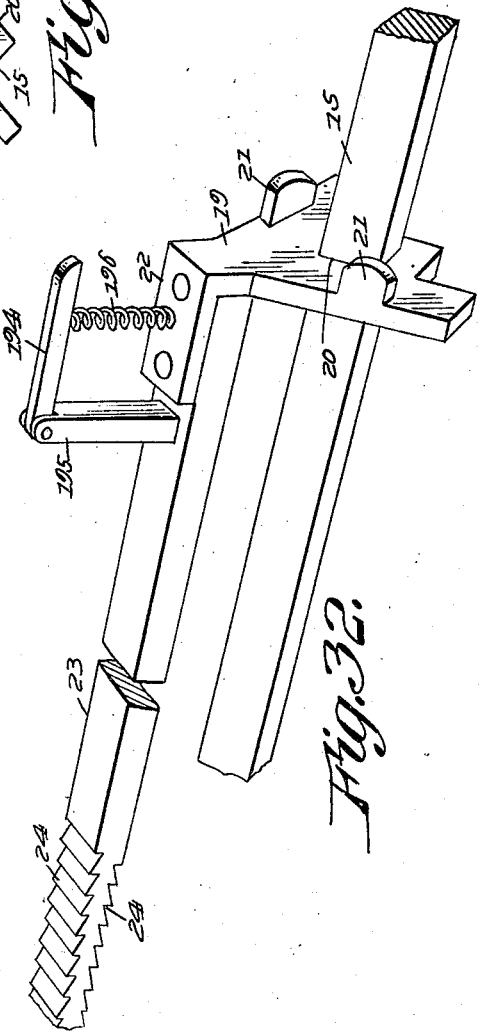

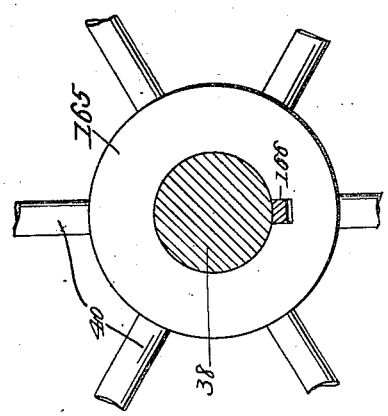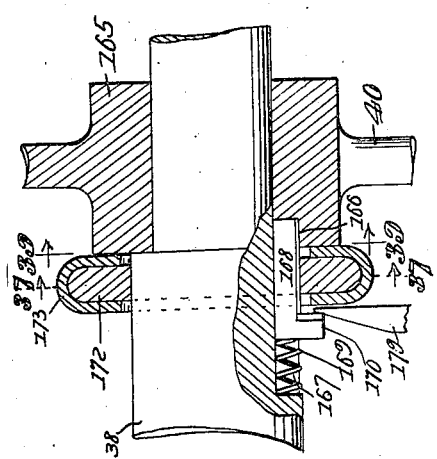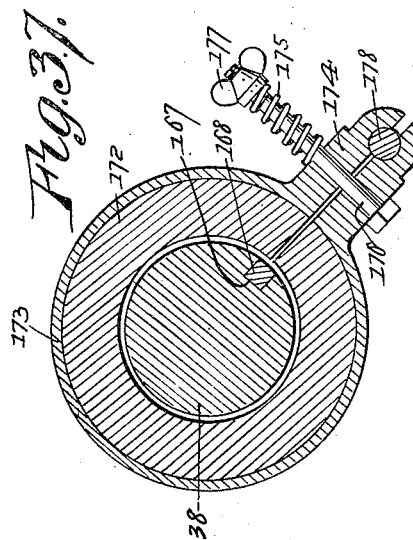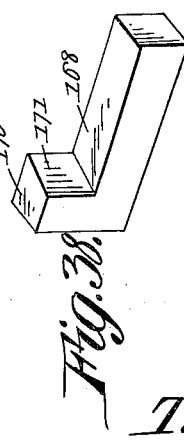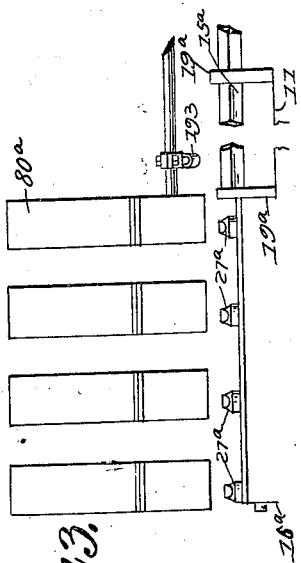

Patented Sept. 26, 1922.

1,430,447

UNITED STATES PATENT OFFICE.

THOMAS M. HOUSE AND HARRY R. McCONNELL, OF RICHMOND, VIRGINIA, ASSIGNORS TO SEWARD TRUNK AND BAG COMPANY, OF PETERSBURG, VIRGINIA, A CORPORATION OF VIRGINIA.

TRUNK-RIVETING MACHINE.

Application filed July 14, 1920. Serial No. 396,110.

*To all whom it may concern:*

Be it known that we, THOMAS M. HOUSE and HARRY R. McCONNELL, citizens of the United States, residing at Richmond, in the county of Henrico and State of Virginia, have invented certain new and useful Improvements in Trunk-Riveting Machines, of which the following is a specification, reference being had to the accompanying drawings.

This invention relates to machines for forming trunks or like containers, and particularly to means for riveting a binder strip over the corner of the trunk or other container at the junction of the side and end walls.

The general object of our invention is to provide a mechanism of this character which will do away with the necessity of driving and overturning the rivets by hand and which is automatic in its action.

A more specific object is to provide a mechanism of this character in which the body of the trunk, which includes the side walls, end walls and bottom wall, is supported upon a supporting member and an anvil, and in which the trunk body and the supporting member and anvil are fed intermittently a predetermined distance at each actuation of the machine so that rivets may be driven through the binding strip and the two walls of the trunk at intervals along the joint between the end wall and the side wall of the trunk.

A further object is to provide means whereby the spacing of these rivets may be controlled.

A further object is to provide means whereby two rivets in transverse alignment with each other may be driven at the same time, and whereby the driving mechanism of one rivet or of both rivets may be thrown out of operation if for any reason it is so desired.

A further object is to provide a continuously operating driving means for the machine and provide hand controlled means whereby the riveting and feeding mechanism may be thrown into or out of engagement with the driving means.

A further object is to provide a presser foot which may be lowered to hold the binding in place upon the corner of the trunk and stretch the binding over the stock.

Still another object is to provide means whereby the spacing of the rivets may be varied by relatively small fractions of an inch.

And another object is to so form the anvil, by bevelling its upper face, that the anvil may be adjusted to compensate for differences in the thickness of two pieces of stock which are being riveted together at right angles to each other.

Still another object is to provide a riveting mechanism wherein the rivet is not subjected to a sudden blow and the machine, therefore, not subjected to the shock which would be caused by this sudden blow on the rivet, but wherein the rivet is yieldingly forced through the stock and overturned.

A further object is to provide means whereby the machine will be automatically stopped when the riveting along one corner of the trunk is finished.

Other objects will appear in the course of the following description.

Our invention is illustrated in the accompanying drawings, wherein:—

Figure 1 is a side elevation of a trunk riveting machine constructed in accordance with our invention;

Figure 2 is a side elevation looking toward the opposite side to that shown in Figure 1;

Figure 3 is a fragmentary front end elevation of the machine;

Figure 3ª is a top plan view of head 80;

Figure 4 is a fragmentary longitudinal sectional view of the rivet holding carrier and the head and the riveting plunger;

Figure 5 is a longitudinal section on the line 5—5 of Figure 4;

Figure 6 is a vertical section through the plunger and anvil;

Figure 7 is a perspective view of the arms carrying the rivet holding and guiding heads;

Figure 8 is a perspective view of one of the riveting holding and guiding heads;

Figure 8ª is a fragmentary plan view through two coacting rivet holding heads;

Figure 9 is a fragmentary elevation showing the means for adjusting the rivet carrying bar;

Figure 10 is a perspective view of the rivet transfer bar;

Figure 11 is a section on the line 11—11 of Figure 10;

Figure 12 is a perspective view of the latch whereby the rivet transfer bar is held from operation;

Figure 13 is a top plan view of the rivet transfer bar and the latch shown in Figure 12;

Figure 14 is a top plan view of the base for the anvil;

Figure 15 is a top plan view of the head of the anvil;

Figure 16 is an under side face view of the head of the anvil;

Figure 17 is a perspective view of the starting lever, shaft and allied parts;

Figure 18 is a sectional view of the starting shaft and an elevation of the automatic stopping lever;

Figure 19 is a fragmentary sectional view of one corner of the riveting head and the angular jaw supporting plate 197 and illustrating the manner in which this plate is yieldingly held in two positions;

Figure 20 is a fragmentary perspective view of the feed rack and the pawls preventing retrograde movement of the rack;

Figure 21 is a side elevation, partly in section, of the rack feeding jaws, the rack, and the means for lifting these jaws from the rack;

Figure 22 is a perspective view of the presser foot operating crank shaft, the presser foot and the means for operating the rivet driving mechanism;

Figure 22ª is a sectional view of the member 148 and the wrist pin 154;

Figure 23 is a perspective view of one of the rivet driving shafts;

Figure 24 is a perspective view of the rivet driving plunger;

Figure 25 is a longitudinal section through the rivet driving plunger;

Figure 26 is an elevation of the riveting tool or shank partly in section;

Figure 27 is an end elevation of the crank motion feed controlling head, the shaft being in section;

Figure 28 is a perspective view of the head and pin which fits within the crank disk of the feed motion;

Figure 29 is a perspective view of the slide or head and crank pin and the parts allied therewith;

Figure 30 is a perspective view of the pawl supporting head and pawls engaging the feed rack bar and the links extending therefrom;

Figure 31 is a side elevation of one of the rivets;

Figure 32 is a perspective view of the feed rack bar and the guide bar upon which it is mounted;

Figure 33 is a rear elevation of the column supporting the machine, the rack bar being in section, and showing in elevation the pawls for preventing retraction of the rack bar;

Figure 34 is a section on the line 34—34 of Figure 33;

Figure 35 is a rear elevation of the sliding yoke which holds the rack bar to the guide bar, the guide bar being shown in section;

Figure 36 is a fragmentary longitudinal sectional view through the hub of the driving pulley, a portion of the driving shaft and the friction device and clutch;

Figure 37 is a section on the line 37—37 of Figure 36.

Figure 38 is a perspective view of the clutch pin;

Figure 39 is a section on the line 39—39 of Figure 36;

Figure 40 is a transverse section of the rivet chute;

Figure 41 is a sectional view through a side and an end wall of the trunk showing the manner in which the binding is riveted to the side and end walls of the trunk where the webs or walls have different thicknesses;

Figure 42 is a like view to Figure 41 but showing the manner in which the rivets engage the binding to hold the side and end of the trunk together;

Figure 43 is a diagrammatic elevation showing the manner in which the riveting mechanism illustrated in Figures 4 to 16 may be arranged for simultaneously driving a plurality of pairs of rivets;

Referring particularly now to Figures 1, 2, and 3, it will be seen that the riveting machine comprises a pillar or supporting column, designated 10, which is mounted upon any suitable base and extends upward to any desired height. This column supports the entire riveting mechanism and the trunk supports and, as illustrated in Figures 1 and 2, the column is provided upon its forward face with a longitudinally extending beam 11, as it may be termed, supported by or formed integral with a triangular web 12 and a transversely extending web 13, these webs 12 and 13 forming a bracket with which the beam 11 may be practically integral, and this bracket being bolted to the column 10. The upper end 11 of the bracket is relatively thick and is adapted for the support of a longitudinal guide bar 15. The forward end of the bracket, as illustrated best in Figure 3, is formed to provide an approximately triangular head 16 having downward and outwardly extending prolongations 17 carrying rollers 18 at their ends. The bar 15, as shown most clearly in Figure 32, is rectangular in cross section and has one of its corners extending upward and is rigidly supported at its forward and rear ends in the head 16 and in the column 10. This bar 15 constitutes a guide for the trunk supporting head 19, illustrated best in Figure 32, which is provided with a square opening 20 slidingly engaging the bar 15. This trunk supporting head 19 is approximately triangular in form, as shown in Figure 35, and is provided with two forwardly extending lugs 21 disposed at an angle of 45° from each other and spaced from the guide 15 so that adjacent portions of a corner at one end of the trunk may be disposed to rest on the bar 15 and be held from jumping away from the bar by these lugs 21. This head 19 at its upper end is angularly bent rearward, as at 22, (see Figure 32) and has riveted or other wise attached to it the longitudinally extending feed bar 23 which is formed for a portion of its length with ratchet teeth 24 upon its upper and lower faces. This toothed portion of this feed bar passes through the column 10, as shown in Figure 34.

Disposed upon the head 16, as illustrated best in Figures 6, 14, 15, and 16 is the anvil. To this end the upper face of the head 16 is flattened or horizontal, and disposed upon this face is a base plate 25 attached to the head 16 by screws and formed at its center with an upwardly extending, circular boss 26, the upper corner of which is bevelled, and the center of which is provided with a screw-threaded opening. Disposed upon the upper face of this plate 25 and over this boss is the anvil 27, as illustrated in Figure 6, the annular base of this anvil being formed, as shown in Figure 16, with four sockets 28, and the plate 25 is provided at one point with an opening within which is disposed a ball latch 29 urged upward by a spring 30, as shown in Figure 6, which ball latch is adapted to be engaged in any one of the sockets 28 and to hold the anvil turned in any one of its adjusted positions. Through the center of the anvil 27 passes the screw 31 which engages the screw-threaded opening in the boss 26 and holds the anvil for rotative adjustment upon the boss, as illustrated in Figures 6 and 15, and this anvil is in the form of a truncated pyramid and is formed with four faces. Two of these faces 32 have the same angle relative to the upper end face 33 of the anvil and start at the same distance from the center screw 31. The other two faces 34 and 35, however, while they have the same angle with relation to the upper end face 33, are not disposed with their upper margins the same distance from the center, but the face 35 is further away from the center 31 of the anvil than the face 34. The reason for this will be more particularly explained hereafter, but it may be stated that where two thicknesses of material disposed at right angles to each other are to be riveted, the anvil is turned so that the faces 32 are disposed on each side of the longitudinal axial line of the machine, but where two pieces of stock of unequal thickness as in Figure 41, are to be riveted, the anvil is disposed, as illustrated in Figure 6, with the faces 34 and 35 on each side of the longitudinal medial axis of the machine. Of course, the ball latch 29 holds the anvil in its adjusted positions.

In riveting the trunk or other container, the angular corner of the container is placed over the supporting and guide bar 15 with the joint at the corner resting upon the anvil 27. The end of the trunk or stock resting against the head 19 with the lugs 21 projecting over the upper surface of the angularly related pieces of the stock, and then the container is intermittently shifted along the supporting guide bar 15 and over the anvil until the riveting is completed. We will now describe the means whereby this shifting of the trunk over the face of the anvil is secured.

As before stated, the feed bar 23 is provided for a portion of its length with the ratchet teeth 24, which teeth extend outward and rearward along the bar 23. Referring now to Figures 1 and 2, and to Figure 22, it will be seen that mounted in suitable bearings 36 and 37 is a main driving shaft 38. The bearing 36 is mounted upon the column 10 and the bearing 37 is operatively supported upon a bracket 39 extending rearward from the column 10 and then extending upward therefrom, as shown most clearly in Figures 1 and 2. This main shaft 38 is driven by a driving pulley 40 which will be later described, and the rear end of this main shaft 38 carries upon it a disk 41. This disk has a T-shaped slot 42 extending radially or transversely across the disk, intersecting the axis thereof, and extending beyond the axis of the disk and shaft 38. Operating in this T-shaped slot is a crank pin, head or slide 43, which is approximately T-shaped to fit the slot, and is formed with an outwardly extending, screw-threaded pin 44 and with pointers 45 coacting with graduations 46 on the walls of the slot. One end of this head 43 is recessed, as at 47, to swivelly receive a head on the end of an adjusting screw 48 provided with a knurled head 49 whereby it may be readily rotated. This adjusting screw passes through the end wall of the slot 42, and it will be obvious that by turning this adjusting screw, the head 43 may be adjusted along the slot 42 and adjusted to any desired distance from the axis of rotation of the disk 41. This adjusting screw 48 is held in its adjusted positions by means of a clamping nut 50. The pin 44 is screw-threaded to receive nuts, and loosely mounted upon this pin is a yoke 51 which is bifurcated, as illustrated most clearly in Figure 29, and pivoted in the bifurcation of this yoke is a link 52 which, at its end remote from the yoke 51, is formed to provide a longitudinally extending slot 53 and beyond this part with a lug 54 pivoted within a knuckle 55 for lateral oscillation. This knuckle 55 in turn is pivoted upon a bell crank lever 56 for oscillation parallel to said lever, and the opposite extremity of the lever is formed with laterally spaced ears 57, in turn pivoted to longitudinally extending links 58 (see Figure 30) which are pivoted to a head 59 having upwardly and downwardly extending pairs of ears 60, between which ears are pivoted the forwardly directed pawls 61, each of these pawls being provided with an inwardly extending tooth 62 at its extremity engageable with the ratchet teeth 24 on the feed bar 23 in the manner illustrated in Figure 21. These pawls are urged towards each other by oppositely disposed pairs of coiled springs 63. It will thus be seen that at every rotation of the shaft 38, a reciprocation will be given to the link 52, an oscillation given to the bell crank 56, and a reciprocation given to the head 59 and pawl 61, the stroke of this reciprocation, and as a consequence, the length of movement given to the feed bar 23, being determined by the distance of the axis of pin 44 from the central axis of the shaft 38.

If the slide 43 is disposed at the extremity of the slot 42, it is obvious that a relatively great length of reciprocation will be given to the pawls 61 and a corresponding relatively long stroke will be given to the feed bar 23. If, on the other hand, the slide 43 be so disposed that the pin 44 is nearly coincident with the axis of the shaft 38, it is obvious that a very small reciprocation will be given to the pawls 61 and a corresponding slight feed will be given to the feed bar 23. Thus, the distance through which the trunk body will be shifted after the placing of each rivet and before the placing of the next adjacent rivet will depend upon and be controlled by the adjustment of the slide 43 by means of the screw 48. The pawls 61 are adapted to be thrown out of engagement with the teeth on the feed bar 23 by means which will be hereafter described.

The forward end of the shaft 38 carries upon it a crank 64, to the wrist pin of which is pivoted a vertical link 65, in turn pivoted in the upper end of a bifurcated head 66 (see Figure 22). This head 66, as illustrated in Figure 6, has a screw-threaded socket 67 on its under face to receive and engage with the upper end of a downwardly extending bolt 68, the shank of which is screw-threaded to engage the socket 67 and is held in adjusted position within said socket by the set nuts 69. The lower end of this bolt 68 is headed, as at 70. This bolt at its lower end enters into the counterbore of a longitudinally bored plunger 71. The counterbore of this plunger is screw-threaded for engagement with a bushing 72 provided with a head 74 whereby it may be rotated. This bushing is held by a set nut 73. This bushing has bearing upon the head 70 to limit the upward movement of the bolt 68, and the head 70 rests upon a coiled compression spring 75 disposed within the bore of the plunger 71. This plunger at its lower end is rectangular in form and is formed to provide a head 76 which, at its lower end, has an upwardly tapering, triangular recess 77 which extends transversely of the head, the side walls of this recess being cut away, as at 78. The end walls of this recess conform in angularity to and are, therefore, parallel with the upper faces of the anvil head 27, as shown most clearly in Figure 6. This plunger 76 constitutes a presser foot which, when lowered, bears upon the binding $c$ at the corner of the trunk and acts to stretch it over the joint while the rivets are being forced through the binding and through the end wall and side wall of the trunk, the spring 75 yielding to permit a slight upward movement of the presser foot formed by the plunger 71 having the head 76 as the presser foot is depressed against the work. The presser foot operates in connection with the means for placing rivets in position on each side of the presser foot and with the riveting plungers, as will be later apparent.

Secured to a forwardly projecting bracket 79 attached to the column 10 is a riveting head 80, a front view of which is illustrated in Figure 3. This head 80 supports a bearing 81 for the forward end of the shaft 38, and the riveting head 80 is attached rigidly to the forward end of this bracket 79. This riveting head, as shown most clearly in Figure 3ª, is formed on its face with a vertically extending groove 82 in which the member 66 slides. The lower end of this groove terminates in an enlarged recess 83 opening upon the front face of the head and open at its bottom. Just above this recess 83, the groove 82 is closed by a plate 84 held in place by screws or other means to the face of the head. This plate terminates at the upper wall of the enlarged portion 83. This enlarged portion 83 has vertical parallel side walls, and the head is formed with downwardly and medially extending grooves or channels 85. These channels are for the passage of the rivets, and disposed within these channels are the lower plates 86 of chutes 87. These chutes extend upward to the hoppers 88, these hoppers being provided with suitable feeding mechanism enclosed in the housings 89 and operated by shafts 90. These shafts carry ratchet wheels 91, and sliding on the shafts is a longitudinally slotted arm 92 (see Figure 2) provided with a pawl 93 engageable with the teeth of the corresponding ratchet 91. These arms 92 are reciprocated to cause the step by step motion of the ratchet wheels 91 in a manner which will be later stated. It may be at this point stated that the mechanism whereby the rivets are fed from the hopper downward into the chutes 87 forms no part of our invention, that we use an ordinary and well known form of rivet feeding mechanism, and that as this riveting feeding mechanism is well known, we have not illustrated the details of this feeding mechanism, except in so far as is necessary for an understanding of the operation of the device.

Extending downwardly and inwardly on each side of the presser foot and opening upon the lower end of the head 80 are bores 94 and disposed in these bores 94 are the riveting plungers 95, each one of said plungers at its lower end being socketed, as at 96, to receive the upper end of a riveting tool 97. Each bore 94 is disposed slightly to one side of the guide channel or slot in plate 86.

The outer end faces of the head 80 are grooved or channelled, as at 98, (see Figure 4) and operating in each channel and held in this channel by a plate 99 attached to the end face of the head and, of course, extending downward and inwardly, is a rod 100. This rod is reduced in thickness at its lower end, as at 101, (see Figure 5), and swingingly mounted on the opposite faces of the rod 100 and disposed at its reduced portion are arms 102 which extend beyond the rod 100, are deflected at 103, and at their ends carry rivet holding jaws designated generally 104. One of these rivet holding jaws is shown in detail in Figure 8. Each rivet holding jaw is recessed at 105 to receive the end of the bar 102, to which it is attached by a bolt 106, and the rivet holding jaw extends upward and inward, and the upper and inner portions of each jaw are recessed to provide a longitudinally extending chamber 107 and enlarged at one end, as at 108, to receive the head of the rivet and the opposite end being tapered, as at 109, and terminating in a groove 110 adapted to embrace the shank of the rivet when the rivet is forced out of the holder or carrier. The rivet is held by these jaws 104 which support the rivet carrier or holder in alignment with the riveting tool 97 so that as the plunger 95 is forced downward, the rivet will be forced longitudinally through the rivet carrying jaws, the extremity of the rivet will be forced through the grooves 110, and the head of the rivet will act to spread the jaws apart, and when the rivet holder is raised from the work, the rivet will be left in the work. The arms 102 are urged towards each other by springs 111 which surround pins 112 which extend through openings 113 in the arms and are engaged with the reduced end of the rod 100, these springs bearing against the heads of these screws and against the arms and acting to urge the arms inward, but, of course, permitting the arms to open laterally away from each other to permit the discharge of the rivet into the work. Each of the rods 100 is normally raised by a spring 114 which is attached at one end to a pin 115 extending from plate 99, and at its other end is attached to a pin 116 projecting from the rod 101 and movable in the slot 117 formed in the lower end of the plate 99. Each rod 100, it is to be understood, will be forced downward by the impact of the riveting tool 97 upon the head of the rivet upon the descent of the plunger 95, and then upon the retraction of this plunger 95 and the riveting tool 97, the spring 114 will act to retract the rod 100 with the rivet holding jaws 104. The extent of retraction of each rod 100 is limited by an adjusting screw 118 mounted in a support 119 extending from the head 80, (see Figure 9) this limiting screw, which forms an adjustable stop, being held in its adjusted position by a clamp nut 120. The extent to which the rivet holding jaws 104 will be retracted will depend upon the thickness of the work. It will be understood, of course, that when the riveting plunger 95 and the riveting tool 97 are forced downward, that the jaws 104 and the riveting tool will operate through the cutaway portion 78 of the presser foot 76.

As before remarked, the axis of the bore 94 and, therefore, the axis of the tool 97, is slightly offset with relation to the line of travel of the rivets 38 in Figure 4, and means is provided for transferring or shifting one rivet at a time from the channel down which the rivets pass to the position where the rivets will drop into the rivet holding jaws 104. This transferring device comprises a transversely shiftable slide, illustrated in Figure 10, and in section in Figure 4 and designated 121. This slide is provided with a flange 122 which engages with a slot. Each slide is mounted in a transversely extending recess 123 formed in each downwardly inclined, lateral wall of the recess 83 in the head. Each slide in its length is formed with a vertically extending, T-shaped slot 124 through which a rivet can pass. One end of the slot is formed with a vertical perforation 125, as seen in Figure 11, this perforation being contracted towards its middle. The slide is also provided upon its vertical face with a vertically extending notch 126. Mounted in bearings upon the face of the plate 84 is a rock shaft 127 having an outwardly projecting arm 128, this arm being connected by a link 129 (see Figure 2) to ears 130 projecting from the yoke 66. Thus upon the depression of the yoke 66 and of the presser foot 76, this shaft 127 will be oscillated. The shaft carries upon it sockets 131, and attached to each of these sockets is a spring 132 which extends upward from the socket and is then formed into a coil and then extends downward, and at its free end is engaged in the socket or perforation 125 of the corresponding transfer bar or member 121. These springs act to hold the transfer members 121 with their slots 124 out of registry with the tracks for the rivets in the rivet channels and in registry with the rivet holding jaws 104, but upon the depression of the presser foot 76 and its allied parts, the shaft 127 will be rocked, causing the springs to act as arms to shift the transfer bars 121 into a position to receive a rivet from the rivet channels. Then as the presser foot rises after a pair of rivets have been driven, the rocking of the shaft 127 will cause the springs, which act as arms, as before stated, to shift the transfer bars or rivet carriers 121 outward to carry the rivets in the slots 124 thereof into position over the corresponding rivet holding jaws 104 and drop the rivets therein.

Thus it will be seen that as the presser foot and its allied parts are reciprocated, a pair of rivets will be transferred from the rivet channels to a position over and drop into the corresponding pairs of rivet holding jaws 104. These transfer bars or rivet transferring carriers provide, therefore, for a feeding of the rivets one by one to the rivet holders 104 and prevent any clogging of these rivet carriers by the rivets feeding downward too rapidly.

The reason for using springs instead of rigid arms for reciprocating the transfer bars or carriers 121 is that by using springs, means may be provided for holding either one or both of the transfer bars from operation when it is desired for any reason to stop the operation of the machine for a moment or so, either as regards both riveting plungers or one of the riveting plungers. To this end each transfer bar is notched, as at 126, as previously stated, and mounted upon the outer face of the head 80 are the latches 133, illustrated in Figures 12 and 13. Each of these latches is pivoted intermediate its ends by a screw 134 and is provided in its outer end with a thumb piece 135, the inner end of each latch being formed with a tooth 136, and below this tooth with a laterally deflected portion 137. The tooth 136 is adapted to be forced downward into engagement with the recess 126 by lifting upward on the thumb piece 135, this tooth 136 preventing a too great depression of the forward end of the latch and the part 137 preventing a too great elevation of the forward end of the latch. Thus, when the transfer bars 121 are drawn outward, they may be latched in their outward position, that is a position where the grooves 124 are out of alignment with the rivet chutes or channels by shifting the latches into engagement with the notches 126 of the transfer bars. It will be seen that the arms 102 are disposed in recesses in the outer face of the head 80, as shown most clearly in Figure 3, and that the rivet holding jaws 104 are protected by shield strips 138 detachably engaged with the front face of the head 80, these strips being of spring material to permit the lateral movement of the arms 102 and the lateral opening movement of the jaws 104.

For the purpose of operating riveting plungers 95, I mount upon bearing brackets 139 on each side of the head the longitudinally extending rock shafts 140, one of which is illustrated in Figure 23. Each rock shaft at its forward extremity carries an arm 141 having a head 142 at its extremity, this head being recessed upon its upper surface, as at 143 (see Figure 25). Each plunger 95 is pivotally connected to a yoke 144 which embraces the head 142 and is provided with a pin, screw or other like device 145 which engages in the socket 143. It will be understood, therefore, that when the shaft 140 is rocked in one direction, these plungers 95 will be forced downward, and when the shaft is rocked in the opposite direction, the plunger 95 will be raised. Each plunger 95 is provided with a suitable drift opening 146 whereby a drift may be inserted to release the tool 97 from its engagement with the plunger 95.

Mounted upon each shaft 140 is an arm in the form of a yoke 147 adapted for the reception of a bearing block 148 (see Figure 22), this bearing block being provided with laterally projecting trunnions 149 engaging in bearings 150 in the yoke 147. This block 148 has a passage extending through it, and extending through this passage is a rod 151 which slides in the passage and is provided at its extremity with limiting nuts 152. This rod is attached to a knuckle 153, in turn attached to the crank pins 154 of cranks 155 and 156 on the shaft 38. A spring 157 surrounds the rod 151 and bears at one end against the block 148 and at its other end bears against a nut 158 having screw-threaded engagement with the rod 151. By means of this nut, the tension of the spring 157 may be regulated. This spring normally forces the block 148 outward against the nuts 152, but the block may move toward the knuckle 153 and compress the spring.

It will now be obvious that as the shaft 38 is rotated, the rock shaft 140 will be oscillated, the riveting plungers 95 will be reciprocated, and that a yielding force will be applied to the yoke-like arms 147 to rock the shaft 140. The cranks 155 and 156 might be connected to their respective rock shafts 140 by an unyielding link, but this would cause a severe blow to be struck upon the rivets by the descent of the plunger and such a blow is inadvisable, practice having shown that it is best to force the rivets into and through the stock by a gradually increasing pressure than by a sudden blow. As each crank moves from its neutral position, the springs 157 will transmit rotation to the corresponding shaft 140, and then as the descent of the corresponding riveting plunger meets with the resistance of the rivet passing into the stock, the springs 157 will be compressed more and more, exerting a pushing force on the rivet plungers, which will push the rivet through and into the stock until the rivets are finally clinched, as illustrated in Figures 41 and 42. Furthermore, these springs and the rods 151 permit the full rotation of the cranks 155 and 156 with a relatively slight rocking movement being transmitted to the rock shafts 140.

For the purpose of operating the feed ratchet operating arms 92, I mount upon each rock shaft 140 an arm 159, this arm being connected by a link 160 (see Figure 2) and a shackle 161 to the lower arm of a bell crank lever 162, the upper arm of this bell crank lever being connected to the corresponding arm 92.

It will now be obvious that as the shafts 140 are rocked, that the ratchets which control the feed of the rivets from the hoppers to the channels or chutes will be actuated one step, the slots in said arms embracing each shaft 90, permitting the rectilinear movement of the arms 92. These bell crank levers 162 are preferably mounted upon a cross shaft 163 supported in brackets 164, these brackets in turn supporting the hoppers 88 and housings 89 in which the feed mechanism is disposed.

The main shaft 38 is driven by a pulley 40 mounted upon this main shaft, the hub 165 of this pulley being formed with a clutch recess 166, as shown in Figures 36 and 39. The main shaft is grooved, as at 167, and disposed therein is the clutch pin 168, which is angular in form and which is illustrated in detail in Figure 38, and which is forced into the recess 166 by means of a spring 169. This pin 168 is provided with a laterally projecting head 170, the inner face of which is bevelled, as at 171. It is desirable to constantly restrain the rotation of the shaft 38 by applying a friction brake thereto so that this shaft will not overrun but will stop as soon as disconnection is effected between the shaft 38 and the driving pulley 40, and to this end there is mounted upon the shaft 38, and preferably adjacent to the hub of the pulley 40, an annular split shoe 172 of hard fiber, this shoe being illustrated in Figures 36, and 37. This shoe, as before stated, is split and is disposed within a metallic split ring 173 which is laterally concave to embrace the shoe, this ring having outwardly projecting ears 174 urged towards each other to contract the ring and thereby contract the split fiber shoe by means of a spring 175 surrounding a pin 176 which extends through the ears 174 and carries a wing nut 177 whereby the tension of the spring 175 may be adjusted. By turning down this wing nut, it is obvious that the spring will be compressed and this spring will act to urge the ears 174 more strongly towards each other and thus tend to compress the fiber shoe 172. The ends of the ears 174 are recessed to engage a supporting member 178 which supports this friction brake. This pin, as illustrated in Figure 17, constitutes a rock shaft carrying upon it a blade 179 whose extremity is bevelled, this blade being adapted to be inserted into position between the bevelled face 171 of the clutch member 168 and the side wall of the ring 73, as shown in Figures 17 and 36, so that when the blade is inserted, it will wedge the clutch member 168 outward from its engagement with the hub of wheel 165, that is its engagement with the recess 166 therein. When the blade 179 is shifted in a reverse direction, it will permit the clutch member to be projected into the recess 166. This shaft 178 carries upon it a member 180, from which depends a link 181. Mounted in suitable bearings 182 on the column 10 is a rock shaft 183 (see Figure 17), and also mounted in bearings 184 is a shaft 185 carrying an arm 186 engaged with the link 181 and which at one end carries an arm 187, this arm being connected by a link 188 to an arm 189 mounted on the end of the shaft 183.

It will be obvious, therefore, that when the shaft 183 is rocked in a clockwise direction, the shaft 185 will also be rocked in a clockwise direction, which will depress the link 181 and rock the shaft 178 in a clockwise direction, thus forcing the wedge-shaped blade 179 into engagement with the bevelled face 171 of the clutch member 168 to shift said clutch member out of its engagement with the driving pulley, and that when the shaft 183 is rotated in the reverse direction, the blade will be shifted from its engagement with the clutch member 168 and the shaft 38 will be clutched to the pulley. This starting shaft 183 carries upon it an operating handle which extends outward and forward, as at 190, and then extends forward, as at 191, to the front of the machine. Also attached to the shaft 183 and adjustable around this shaft is an automatic clutch shifting or knock-off arm 192 carrying a roller 193 at its end (see Figure 17). This is adapted to be engaged by a shifting finger 194 (see Figure 32) mounted upon a post 195 on the feed bar 23, this finger being bevelled or rounded downward at its forward end and being yieldingly supported by a spring 196 extending upward from the lug 22 of the head or plate 19. Now when the feed bar 23 has moved forward to its full extent, this knock-off finger 194 will engage the roller 193 and lift this roller, thus rotating the arm 192, and rocking shaft 183 in a counter-clockwise direction, thus shifting the clutch blade 179 into engagement with the clutch pin or member 168 and shifting it out of engagement with the driving pulley 165, thus automatically disconnecting the shaft 38 from the driving pulley. It will be seen that by giving the shaft 183 a clockwise rotation through the handle 191, the blade 179 will clutch the shaft 38 to the driving pulley and that a reverse motion given to the knock-off arm 192 will unclutch the shaft and driving pulley and that this unclutching of the shaft and driving pulley is automatic in its action when the feed bar has moved to its full extent.

In order to permit the feed bar 23 to be shifted backward to its initial position after one trunk has been riveted or whenever desired, it is obviously necessary to disengage the pawls 61. To the end of opening these pawls 61 when the machine is stopped and thus putting the parts in such position that the rest 19 may be shifted upon the bar 15 to any desired position, I attach to the upwardly extending portion of bracket 39, as illustrated in Figure 2, the sliding plate 197, shown in detail in Figure 17, this plate being slotted, as at 198, for the passage of a bolt or screw 199 upon which the plate slides, and this plate being provided with an angularly extending portion 200 and with forwardly projecting ears 201. The angularly projecting portion 200 has a central opening 202 for the passage of the feed bar 23 and above and below this opening and projecting forwardly therefrom are the fingers 203, the outer faces of which are reduced for a portion of their length, as at 204, and terminate at their inner ends in bevelled faces 205. When the extremities of these blades or fingers 203 engage the inwardly extended extremities of pawls 61, as in Figure 21, it is obvious that they will lift these pawls from their engagement with the teeth of the feed bar 23. When these fingers are retracted, the thin portions 204 of the fingers lie rearward of the toothed extremities of the pawls 61. It will be seen that there are two positions for the plate 197 and, therefore, for the fingers 203, and the plate or slide 197 is yieldingly held in these two positions by ball latches 206 forced into recesses 207 in the inner face of plate 197 by springs 208 (see Fig. 19).

The plate is automatically shifted to one or the other of its two positions by the rocking of shaft 183. This is accomplished by providing a short transverse shaft 209 mounted in a bearing 210, which shaft carries upon it the upwardly projecting arm 211 connected by a link 212 to the ears 201 and the extremity of this shaft is provided with a forwardly extending arm 213 connected by a link 214 to the arm 187. Therefore, as this arm 187 is raised, the shaft 209 will be rocked in the direction of the arrow in Figure 17 and the slide 197 will be carried rearward, and on the other hand, when the shaft 183 is rocked in a clockwise direction by the knock-off arm 192, the shaft 209 will be rocked in a reverse direction to that of the arrow in Figure 17, thus pulling the slide 197 forward and inserting the fingers between the pawls 61 and the teeth 24 on the feed bar 23.

Dogs are provided for preventing the reverse movement of the feed bar 23, and these dogs are illustrated in Figure 20 and designated 215 and 216. These dogs extend vertically upward and are disposed parallel to each other and are of different thicknesses, each dog being formed with a bevelled face upon its upper end. The dogs extend at their lower ends laterally, as at 217, and are urged upward by springs 218. They are capable of being depressed by an arm 219 notched at its forward end to engage over the laterally projecting lugs 217, this arm 219 being mounted upon the shaft 209, as shown in Figure 17. It will be seen from Figure 34 that the pawls are of different thicknesses in order that one of the pawls may always engage fully against a ratchet tooth on the under side of the feed bar 23 without regard to the adjustment of the feed mechanism. This rack bar, as illustrated, passes through a passage 220 in the column 10 and the pawls are held in proper position by a plate 221 attached to the face of the column 10, this plate being vertically slotted, as at 222, for the reception of the toothed extremity of the arm 219.

In Figure 41 we show the side board or web $a$ of a trunk X or container, and at $b$ show the end board of the trunk. These boards are shown as having layers of paper or pasteboard on their outer and inner surfaces or layers of veneer or any other suitable material. $c$ designates the binding which extends over the joint at the corner of the end board with the side board. The side and end boards of the trunk and the bottom board (as shown in Figure 42) are initially nailed to each other so that a box-like body is formed, open of course on one side where the cover is to be hinged. The mechanism for riveting the binding strips connecting the side boards to the bottom board is disclosed and claimed in a separate application filed by us June 24, 1920, Serial #396,109, the mechanism which we have described being for the purpose of riveting end boards and side boards to the binding strips at the joints of the side and end boards. It will be seen from Figure 41 that the bottom board is relatively thick in comparison with the end boards and that the rivets which pass into the bottom board do not go entirely therethrough. In actual practice, however, the cleft ends of the rivets expand by a wedge of wood or like material being formed in advance of the rivet as it is forced inward, and this acts to expand the rivet, as shown in Figure 41. Thus it is only necessary to have one size of rivets for the side board and the end board. The rivets, of course, pass entirely through the end board and are expanded against the anvil itself. As shown in Figure 42, the side boards and end boards are of the same thickness and, therefore, both sets of rivets are expanded against the anvil.

The detailed operation of the various parts of this mechanism have been heretofore referred to, but the general operation is as follows:—If it is desired, for instance, to rivet the binding strip to the corner or joint between the side and the end of the trunk, the anvil is arranged as in Figure 6. The controlling handle 191 is depressed, which rotates the shaft 183 in a direction which will disengage the driving pulley from shaft 38 and which will cause the fingers 203 to lift up the pawls 61 from their engagement with the rack teeth 24 of the feed bar 23. This leaves the feed bar free to be shifted rearward so as to carry the supporting head 19 to the rear end of the guide bar 15. The corner of the open end of the trunk is then disposed over the guide bar 15 with its edges underneath the lugs 21. Now at this time it is necessary that the supporting head 19 and the trunk should be so adjusted with relation to the anvil 27 that the first pair of rivets shall be driven a certain spaced distance from the outer corner of the trunk, this distance depending upon the predetermined distance of the pairs of rivets from each other. We have, therefore, provided for this adjusting purpose a stop screw or like element 223 (see Figures 1, 2, and 3), which screw 223 is to be adjusted outward or inward so as to engage the bottom of the trunk and thereby control the distance between that wall of the trunk which extends parallel to the face of the anvil support 16 and the axis of the anvil. As before stated, this distance depends upon the predetermined spacing of the rivets. This is a very important feature of the invention, as by its means the rivets are started properly spaced from the forward end of the work.

After the trunk or other container has been put in place over the anvil and engaged with the supporting head 19, the lugs 21 preventing any tipping up of the trunk or container, the lever 191 is thrown upward, which acts to retract the slide 197 and consequently retract the fingers 203 from engagement with the pawls 61 and at the same time lift the plunger 219 to permit the upward movement of the pawls 215 and 216 into engagement with the lower teeth on the bar 23 and at the same time this movement of the operating handle 191 operatively connects the driving pulley 40 with the driving shaft 38 in the manner heretofore described.

As soon as the handle 191 has been shifted, as before described the riveting proceeds automatically. The rotation of shaft 38 causes the intermittent depression of the pressor foot 76 and the intermittent feed of rivets to the rivet holding heads or jaws 104 and the intermittent depression of the riveting plungers. As soon as the riveting plungers have been lifted after driving one pair of rivets, the crank 41 operates to shift the feeding bar 23 forward one inch and the operation is repeated for a second pair of rivets. This continues until the rear end of the trunk or container reaches the anvil, and after the last pair of rivets have been driven, the arm 194 on the forward end of the feed bar 23 engages the arm 192 to rotate the shaft 183 in a counterclockwise direction to thereby disengage the clutch between shaft 38 and the driving pulley 40 and at the same time disengage the pawls 61 from their engagement with the teeth 24. Then, as before stated, the supporting head 19 is shifted to its rearmost position and if new work is to be done, the adjusting screw 223 is adjusted and the work continued.

While we have heretofore described a machine in which the trunk or container is fed step by step rearward past a single riveting head and single anvil so that pairs of rivets are successively driven, yet we do not wish to be limited to this, as it is obviously possible to provide a plurality of riveting heads and anvils disposed at intervals, as illustrated in Figure 43, so that a plurality of pairs of rivets may be placed and overturned at one time. Thus, in Figure 43 we illustrate a series of four anvils 27$^a$ and a series of four riveting heads 80$^a$, each riveting head being constructed in exact accordance with the mechanism heretofore described for the riveting head 80, and we have illustrated these anvils as being mounted upon an elongated member 16$^a$, a guide bar 15$^a$, and a supporting head 19$^a$, this supporting head instead of being moved only one step, however, will be shifted back a distance normally equal to four pairs of rivet spacings at one time. Thus, four pairs of rivets will be driven at one time, as in Figure 43, and then the trunk or container fed forward to receive four more rivets. We have not considered it necessary to show the details of construction in Figure 43, as these are precisely the same as those heretofore described.

By the mechanism heretofore described it is possible to very readily place the binding strips c between the side and end boards and rivet these strips in place with a minimum of labor and with an accuracy which is not possible with hand work. It will be seen that if any rivet is misplaced or not properly overturned, the rivet feeding mechanism and driving mechanism on one side or the other or both sides may be cut out of operation by the latches 133 so that the feed of the container may be reversed to carry it back to the position where the faulty rivet occured and new rivets driven.

As before remarked, the rivet is driven not by a blow driving the rivet suddenly through the stock, but by a gradually increasing pressure which forces the rivet through the stock and overturns the shank of the rivet. It will be found in actual practice that this is preferable to driving the rivet suddenly through, as the shock and jar to the machine is great, and further the wood or other stock is apt to be cracked or broken or a plug driven out by the sudden driving in of the rivet. By reason of the spring 157, no jar is communicated to the machine when the rivet is forced inward, and as a consequence the machine operates easily, steadily, and with a minimum of wear. The machine is adjustable to trunks or containers of various sizes and with stock of various thicknesses and the rivets may be placed within $\tfrac{1}{8}''$ of each other or spaced apart $\tfrac{1}{2}''$, or more, if desired, depending upon the size of the disk 41 and the range of adjustment of the slide 43 therein.

We claim:—

1. A rivet driving mechanism of the character described including an anvil, rivet driving mechanism disposed above the anvil, means for supporting work upon the anvil, means on the anvil for adjustably predetermining the distance from the end of the work at which the first rivet shall be driven, means for intermittently feeding the work over the anvil in one direction, means for actuating the rivet driving mechanism while the work is stationary, and means for stopping the feeding and rivet driving mechanism when the work has travelled a predetermined distance over the anvil.

2. A rivet driving mechanism of the character described including an anvil, rivet driving mechanism disposed above the anvil, means for supporting work upon the anvil, means on the anvil for predetermining the distance from the end of the work at which the first rivet shall be driven, means for intermittently feeding the work over the anvil in one direction, means for actuating the rivet driving mechanism while the work is stationary, means for stopping the feeding and rivet driving mechanism when the work has travelled a predetermined distance over the anvil, and means for adjustably varying the distance which the work moves on each feeding operation.

3. A riveting machine including an anvil, riveting mechanism disposed above the anvil, means for supporting and intermittently feeding the work in one direction over the anvil in one direction, means for automatically causing the operation of the rivet driving mechanism when the work is stationary, means for automatically stopping the rivet feeding and rivet driving mechanism when the work has moved a predetermined distance over the anvil, and an adjustable stop carried upon the anvil and adjustably limiting the distance between the end of the work and the anvil.

4. A rivet driving mechanism including a supporting column, a support carried by said column, a fixed anvil mounted upon said support, a carriage movable toward and from the anvil and having a container supporting portion disposed on a level with the anvil, power operated means for shifting the carriage toward the anvil, rivet driving means disposed over the anvil, power operated carriage feeding mechanism acting to give an intermittent step by step movement to the carriage, power operated means for operating the rivet driving mechanism, and means acting to automatically disconnect the rivet driving mechanism and the carriage feeding mechanism from the source of power when the carriage has moved toward the anvil a predetermined distance.

5. A riveting mechanism of the character described including an anvil having downwardly divergent faces, a supporting rod extending from the anvil and having downwardly and laterally inclined faces in the same plane as the inclined faces of the anvil, and container supporting means slidingly mounted upon said rod, the anvil having downwardly divergent portions adapted to support the sides of the trunk and having wheels.

6. A riveting mechanism of the character described including a fixed anvil on which work may be supported, a vertically reciprocatable presser foot disposed above the anvil and movable toward and from the anvil, the anvil having oppositely inclined faces, the under face of the presser foot being recessed to correspond with said inclined faces, means for feeding rivets into position above the inclined faces of the anvil, and means for simultaneously pressing the said rivets through the work and against the inclined faces of the anvil.

7. A riveting mechanism of the character described including an anvil, means for supporting work upon the anvil, means for supporting a rivet in position over the work, means for yieldingly forcing said rivet through the work and against the anvil including a rock shaft operatively connected to the plunger and having an arm, a power operated shaft having an arm, a connecting rod extending from the last named arm to the first named arm, a sliding member operatively connected to the last named arm and slidingly mounted upon the connecting rod, and a spring yieldingly resisting movement of the sliding member as the power shaft is operated but transmitting power to the arm on the rock shaft to cause the oscillation of the latter.

8. A riveting mechanism of the character described including an anvil, means for supporting work on the anvil, a power shaft, a presser foot disposed above the anvil and operatively connected to the power shaft to cause a vertical reciprocation of the presser foot upon a rotation of the power shaft, a riveting plunger co-acting with the anvil and work, a rock shaft operatively connected to the riveting plunger to reciprocate it upon an oscillation of the rock shaft, means for giving an oscillation to the rock shaft comprising a crank arm on the power shaft, a connecting rod extending from the crank arm, a sliding member mounted on the connecting rod, an arm on the rock shaft to which the sliding member is operatively connected, and a spring resisting movement of the sliding member as the power shaft is rotated.

9. A riveting mechanism of the character described including an anvil having oppositely inclined faces, means for supporting work on said anvil, means for alternately shifting the work over the anvil and stopping the motion of the work, oppositely disposed rivet holders on each side of said anvil, means for feeding rivets one by one to said rivet holders, and means for forcing the rivets into and through the work and against the anvil comprising oppositely disposed plungers, rock shafts operatively connected to said plungers to cause their reciprocation, a power operated shaft, and operative connections between the power operated shafts and each of said rock shafts whereby to cause the oscillation of the rock shafts for each rotation of the power operated shaft.

10. A riveting mechanism of the character described including an anvil having oppositely inclined faces, means for supporting work on said anvil, means for alternately shifting the work over the anvil and stopping the motion of the work, oppositely disposed rivet holders on each side of said anvil, means for feeding rivets one by one to said rivet holders, means for forcing the rivets into and through the work and against the anvil comprising oppositely disposed plungers, rock shafts operatively connected to said plungers to cause their reciprocation, a power operated shaft having crank arms, rods operatively connected to the crank arms and extending to arms on the rock shafts, members slidably mounted on the connecting rod and pivotally engaged with the arms of the rock shafts, and compression springs operatively engaging the connecting rods with said sliding members and compressed upon an initial movement of the power operated shaft in a direction to cause the plungers to force the rivets into the work.

11. A riveting mechanism of the character described including an anvil, a support therefor upon which the anvil is rotatably mounted for rotation in a horizontal plane, the anvil having two inclined faces, the upper ends of which are spaced equi-distantly from the center of motion of the anvil for use with box sides of the same thickness, and two inclined faces, the upper ends of which are disposed, one close to the center of motion of the anvil and one relatively remote therefrom for use with box sides of different thicknesses, and means for holding the anvil in rotatably adjusted positions with relation to its axis.

12. A riveting mechanism of the character described including an anvil support, an anvil rotatably mounted upon said support and rotatably adjustable with relation thereto, said anvil having four inclined faces, all of said inclined faces having the same angle, two of said inclined faces being equi-distantly spaced from the rotative axis of the anvil so that they may be used with box sides of the same thickness, and the other two inclined faces being disposed unequidistantly from said rotative axis so that they may be used with box sides of different thicknesses.

13. In a riveting machine, an anvil having inclined faces, a member vertically reciprocatable toward and from the anvil, a presser foot carried by said member and having limited sliding movement with relation thereto, means for adjusting the presser foot toward and from the anvil, means yieldingly urging the presser foot toward the anvil, and means limiting the movement of the presser foot toward said reciprocating member.

14. A riveting mechanism including a fixed anvil, a rivet holder coacting with the anvil and comprising two arms resiliently urged into parallel relation, said arms at their extremities having two off-set jaws formed to loosely support a rivet between them, a riveting plunger reciprocatable parallel to the arms and through the space between said jaws and toward and from the anvil, means for feeding rivets one by one into the space between said jaws when the jaws are closed including a rivet holding chute down which rivets move by gravity, a reciprocatable transfer member having a slot to receive said rivets from the chute, said member, when shifted to carry its slot over the holder, depositing a rivet in said holder, a rivet driving plunger reciprocatable through said rivet holder and toward or from the anvil, power operated means for reciprocating the rivet driving plunger and the transfer member, and means for holding the transfer member from operation by said power operated means.

15. A riveting mechanism including an anvil, a rivet holder coacting with the anvil and comprising two arms resiliently urged into parallel relation, said arms at their extremities having two jaws formed to loosely support a rivet between them, a riveting plunger reciprocatable through the space between said jaws and toward and from the anvil, means for feeding rivets one by one into the space between said jaws when the jaws are closed including a rivet holding chute down which rivets move by gravity, a reciprocatable transfer member having a slot to receive said rivets from the chute, said member, when shifted to carry its slot over the holder, depositing a rivet in said holder, a rivet driving plunger reciprocatable through said rivet holder and toward or from the anvil, power operated means for reciprocating the rivet driving plunger and the transfer member, means for holding the transfer member from operation by said power operated means including a resilient arm operatively engaged with the transfer member, means for oscillating said arm to thereby reciprocate the transfer member, and a latch shiftable to hold the transfer member from reciprocation.

16. A riveting mechanism including an anvil, a rivet holder coacting with the anvil and comprising two arms resiliently urged into parallel relation, said arms at their extremities having two jaws formed to loosely support a rivet between them, a riveting plunger reciprocatable through the space between said jaws and toward and from the anvil, means for feeding rivets one by one into the space between said jaws when the jaws are closed including a rivet holding chute down which rivets move by gravity, a reciprocatable transfer member having a slot to receive said rivets from the chute, said member, when shifted to carry its slot over the holder, depositing a rivet in said holder, a rivet driving plunger reciprocatable through said rivet holder and toward or from the anvil, power operated means for reciprocating the rivet driving plunger and the transfer member, means for holding the transfer member from operation by said power operated means including a vertically movable, power operated, constantly reciprocatable member, a shaft operatively connected thereto and rocked thereby, a resilient arm extending from said shaft to the transfer member and causing the reciprocation of the latter, and a latch holding the transfer member from reciprocation by said resilient arm.

17. In a riveting machine, a work supporting anvil, a vertically reciprocating presser foot coacting therewith, oppositely disposed rivet holders disposed on each side of the anvil and directed toward the anvil and each including a pair of jaws resiliently urged towards each other, each rivet holder being mounted for longitudinal movement toward and from the anvil, a spring urging the rivet holder away from the anvil, means for feeding rivets automatically to the rivet holders, a pair of plungers, each coacting with one of said rivet holders and reciprocatable through said rivet holders and toward and from the anvil, and when in engagement with the rivet and moving toward the anvil, carrying the rivet holder toward the anvil, and upon a rearward movement permitting the reciprocation of the rivet holder, power operated means for reciprocating the presser foot feeding rivets to the rivet holders and reciprocating said rivet driving plungers, and manually controlled means for preventing the feeding of rivets to the rivet holders.

18. A riveting machine including a work supporting anvil and a presser foot coacting therewith, said presser foot comprising a body having a longitudinally extending bore screw-threaded for a portion of its length, a sleeve screw-threaded in said bore, a plunger member sliding through said sleeve and having a head at its inner end, a spring disposed within the bore and bearing against the head, and a yoke adjustably mounted upon the extremity of said plunger member and acting to limit the movement of the plunger member relative to the sleeve.

19. A riveting mechanism of the character described including a supporting column having an outwardly projecting bracket on one face, a work supporting anvil mounted upon said bracket and having oppositely inclined faces, a supporting rod extending rearward from the work supporting anvil to the column, and container supporting means slidably mounted upon said rod.

20. A riveting mechanism of the character described including a supporting column having an outwardly projecting bracket on one face, a work supporting anvil mounted upon said bracket and having oppositely inclined faces, a supporting rod extending rearward from the work supporting anvil to the column, and container supporting means slidably mounted upon said rod, the anvil being provided with downwardly divergent arms carrying rollers at their lower ends.

21. A riveting mechanism of the character described including a work supporting anvil, a supporting bar extending from the anvil, means slidably mounted upon said bar for supporting one end of a piece of work upon the bar and holding the work in position over the anvil, means for giving intermittent longitudinal movement to said work supporting means including a power operated shaft, a crank pin mounted upon said shaft for transverse adjustment relative to the axis of the shaft, a rearwardly extending bar connected to the work supporting member and having ratchet teeth on opposite faces, a pawl carrier slidably mounted upon the bar and having oppositely disposed, spring actuated pawls engaging the ratchet toothed bar upon a forward movement of the carrier and sliding over the ratchet teeth upon a rearward movement of the carrier, and means operatively connecting the wrist pin and said carrier to cause a reciprocation of the carrier upon a rotation of the wrist pin.

22. A riveting machine including a riveting anvil, riveting mechanism associated with the anvil, a supporting bar extending from the anvil, a work support slidably mounted upon said bar and movable toward or from the anvil, means for giving the work support a step by step movement toward the anvil comprising a ratchet toothed bar carried by the work support, a pawl carrier coacting with the bar and a resiliently actuated pawl carried thereby and engaging the bar, means for reciprocating said pawl carrier comprising a power operated shaft having a transversely slotted head on one end, a member adjustable in said head nearer to or further from the axial center of the head and having a wrist pin, and an operative connection between said wrist pin and the pawl carrier to cause the reciprocation of the latter upon a rotation of the wrist pin around its axial center 23. A riveting machine including a work supporting anvil, a work support and holder movable toward the anvil to carry the work over the anvil, riveting mechanism associated with the anvil, mechanism for intermittently shifting the work support toward the anvil and including a longitudinally extending bar extending from the work support and having ratchet teeth, a pawl carrier through which said bar passes, a resiliently actuated pawl mounted thereon and engaging the ratchet teeth upon a movement of the pawl carrier in one direction but riding over the ratchet teeth upon a movement of the pawl carrier in an opposite direction, power operated means for reciprocating said pawl carrier, and means for automatically releasing the pawl from its operative engagement with the ratchet bar upon the arrival of the work support at a predetermined position with relation to the anvil comprising a member longitudinally shiftable through the pawl carrier into position between the pawl and the teeth but normally retracted from said position, and a member operatively connected to said longitudinally shiftable member and actuated to shift the longitudinally shiftable member to disengage the pawl and shifted by the arrival of the work holder in engagement with said last named member.

24. A riveting machine of the character described comprising a fixed supporting anvil and guide bar extending therefrom, a trunk supporting member movable over said guide bar toward and from the anvil, riveting mechanism associated with the anvil, mechanism for giving a step by step movement to the work support, a driving shaft, operative connections between the driving shaft and the riveting mechanism, a power operated driving member for the power shaft normally out of engagement therewith, means operatively connected to the power shaft for causing the step by step forward movement of the trunk holder, a manually operable member shiftable in one direction to operatively connect the driving member to said driving shaft to transmit power thereto and, when moved in the other direction, to operatively disconnect the driving member from the driving shaft, mechanism connected to the driving shaft for giving a step by step movement to the trunk holder, and means connected to said member for operatively disconnecting the said step by step mechanism from the trunk holder when said member is shifted to disconnect the driving member from the driving shaft.

25. A riveting machine of the character described comprising a fixed supporting anvil and guide bar extending therefrom, a trunk supporting member movable over said guide bar toward and from the anvil, riveting mechanism associated with the anvil, mechanism for giving a step by step movement to the work support, a driving shaft, operative connections between the driving shaft and the riveting mechanism, a power operated driving member for the power shaft normally out of engagement therewith, means operatively connected to the power shaft for causing the step by step forward movement of the trunk holder, a manually operable member shiftable in one direction to operatively connect the driving member to said driving shaft to transmit power thereto and, when moved in the other direction, to operatively disconnect the driving member from the driving shaft, mechanism connected to the driving shaft for giving a step by step movement to the trunk holder, means connected to said member for operatively disconnecting the said step by step mechanism from the trunk holder when said member is shifted to disconnect the driving member from the driving shaft, and means for automatically causing the shifting of said member in a direction to disconnect the step by step mechanism from the trunk holding member and disconnect the driving member from the driving shaft when the trunk holder has moved into predetermined contiguity with the anvil.

26. In a riveting mechanism, a fixed anvil over which the work passes, a guide bar extending from the anvil, a work support formed to engage one of the ends of the article to be supported on the anvil shiftable along the guide bar toward and from the anvil, power operated pawl and ratchet means for giving a step by step movement of the work support toward the anvil, and manually operable means for releasing said pawl and ratchet means from its operative position with relation to the work support to thereby permit the work support to be shifted away from the anvil.

27. A mechanism of the character described including an anvil over which the work passes, riveting mechanism associated with the anvil, a guide bar extending from the anvil, a work support slidably mounted upon the guide bar and having a bar extending rearward therefrom formed upon its opposite faces with rearwardly extending ratchet teeth, spring actuated detent pawls preventing the rearward movement of said ratchet toothed bar, and means for causing an intermittent forward movement of the ratchet toothed bar comprising a pawl carrier through which said bar moves, oppositely disposed spring operated pawls carried upon said pawl carrier and engaging the teeth of said bar, and power operated means for causing the reciprocation of the pawl carrier.

28. A mechanism of the character described including an anvil over which the work passes, riveting mechanism associated with the anvil, a guide bar extending from the anvil, a work support slidably mounted upon the guide bar and having a bar extending rearward therefrom formed upon its opposite faces with rearwardly extending ratchet teeth, spring actuated detent pawls preventing the rearward movement of said ratchet toothed bar, means for causing an intermittent forward movement of the ratchet toothed bar comprising a pawl carrier through which said bar moves, oppositely disposed spring operated pawls carried upon said pawl carrier and engaging the teeth of said bar, power operated means for causing the reciprocation of the pawl carrier, means for operatively disengaging the pawls from the ratchet toothed bar including a slidingly mounted member having tongues passing through the pawl carrier and adapted to be forced between the ends of the pawls and the ratchet teeth on the bar, and means for automatically causing the projection of said slidable member to disengage said teeth when the work support and holder has moved into predetermined relation to the anvil.

29. A mechanism of the character described including an anvil over which the work passes, riveting mechanism associated with the anvil, a guide bar extending from the anvil, a work support slidably mounted upon the guide bar and having a bar extending rearward therefrom formed upon its opposite faces with rearwardly extending ratchet teeth, spring actuated detent pawls preventing the rearward movement of said ratchet toothed bar, means for causing an intermittent forward movement of the ratchet toothed bar comprising a pawl carrier through which said bar moves, oppositely disposed spring operated pawls carried upon said pawl carrier and engaging the teeth of said bar, power operated means for causing the reciprocation of the pawl carrier, means for operatively disengaging the pawls from the ratchet toothed bar including a slidingly mounted member having tongues passing through the pawl carrier and adapted to be forced between the ends of the pawls and the ratchet teeth on the bar, means for automatically causing the projection of said slidable member to disengage said teeth when the work support and holder has moved into predetermined relation to the anvil and including a rock shaft operatively connected to the sliding member, a longitudinally extending shaft extending parallel to the path of movement of the pawl holder and operatively connected to the rock shaft to cause its oscillation upon a return of the longitudinally extending shaft, and an arm on the longitudinally extending shaft struck by a member on the work support when the work support and holder have moved into predetermined relation to the anvil.

30. A mechanism of the character described including an anvil over which the work passes, riveting mechanism associated with the anvil, a guide bar extending from the anvil, a work support slidably mounted upon the guide bar and having a bar extending rearward therefrom formed upon its opposite faces with rearwardly extending ratchet teeth, spring actuated detent pawls preventing the rearward movement of said ratchet toothed bar, means for causing an intermittent forward movement of the ratchet toothed bar comprising a pawl carrier through which said bar moves, oppositely disposed spring operated pawls carried upon said pawl carrier and engaging the teeth of said bar, power operated means for causing the reciprocation of the pawl carrier, means for operatively disengaging the pawls form the ratchet toothed bar including a slidingly mounted member having tongues passing through the pawl carrier and adapted to be forced between the ends of the pawls and the ratchet teeth on the bar, means for automatically causing the projection of said slidable member to disengage said teeth when the work support and holder has moved into predetermined relation to the anvil and including a rock shaft operatively connected to the sliding member, a longitudinally extending shaft extending parallel to the path of movement of the pawl holder and operatively connected to the rock shaft to cause its oscillation upon a return of the longitudinally extending shaft, an arm on the longitudinally extending shaft struck by a member on the work support when the work support and holder have moved into predetermined relation to the anvil, and a handle on said longitudinal shaft whereby it may be manually oscillated.

31. A mechanism of the character described including an anvil over which the work passes, riveting mechanism associated with the anvil, a guide bar extending from the anvil, a work support slidably mounted upon the guide bar and having a bar extending rearward therefrom formed upon its opposite faces with rearwardly extending ratchet teeth, spring actuated detent pawls preventing the rearward movement of said ratchet toothed bar, means for causing an intermittent forward movement of the ratchet toothed bar comprising a pawl carrier through which said bar moves, oppositely disposed spring operated pawls carried upon said pawl carrier and engaging the teeth of said bar, power operated means for causing the reciprocation of the pawl carrier, means for operatively disengaging the pawls from the ratchet toothed bar including a slidingly mounted member having tongues passing through the pawl carrier and adapted to be forced between the ends of the pawls and the ratchet teeth on the bar, means for automatically causing the projection of said slidable member to disengage said teeth when the work support and holder has moved into predetermined relation to the anvil and including a rock shaft operatively connected to the sliding member, a longitudinally extending shaft extending parallel to the path of movement of the pawl holder and operatively connected to the rock shaft to cause its oscillation upon a return of the longitudinally extending shaft, an arm on the longitudinally extending shaft struck by a member on the work support when the work support and holder have moved into predetermined relation to the anvil, a handle on said longitudinal shaft whereby it may be manually oscillated, means for reciprocating the pawl carrier and operating the riveting mechanism including a driven shaft, a driving member loose on the driven shaft, a clutch normally connecting the driving shaft and driving member, and means connected to said longitudinal shaft for causing the release of said clutch when the longitudinal shaft is shifted in a direction to cause the disengagement of the pawls from said ratchet toothed bar.

32. A riveting machine of the character described comprising an anvil having oppositely inclined faces, a guide bar extending from the anvil and rectangular in cross section and having its upper corner disposed in alignment with the junction of the bevelled faces of the anvil, the anvil having downwardly and outwardly extending arms disposed in alignment with the inclined faces of the anvil and having rollers at their lower ends, and a work support having an angular seat coinciding with the corners of the guide bar, said work support being movable over the guide bar, oppositely disposed rivet feeding and driving mechanism extending at right angles to the inclined faces of the anvil, and power operated means for operating said rivet feeding and driving mechanisms and giving a step by step movement to the work support.

33. A riveting machine of the character described comprising a column, a bracket mounted upon the column and extending forwardly therefrom, an anvil mounted upon the bracket and having oppositely inclined faces, the bracket carrying downwardly and outwardly extending trunk supporting members, a guide bar extending rearward from the anvil and supported upon the bracket and rectangular in cross section, a member slidable upon the guide bar and formed to support one end of a trunk or other container, a head disposed above the anvil, brackets extending from the column supporting the head, a presser foot vertically reciprocatable in the head and formed at its lower end with an angular recess to engage the corner of a trunk, the side walls of the recess being cut away, oppositely disposed riveting plungers reciprocatingly mounted in the head and extending downward and toward the anvil, rivet carrying chutes extending downward through the head and inward toward each other, rivet holders mounted in the head at the lower ends thereof and on each side of the presser foot chamber and in alignment with the riveting plungers, means for transferring rivets one by one from the chutes to said holders, means for feeding rivets one by one to said riveting chutes, a main shaft, a driving wheel loosely mounted thereon, a clutch for connecting the driving wheel to the shaft or disconnecting it therefrom, means actuated by the main shaft for giving a step by step forward movement to the slidable trunk supporting member, oppositely disposed cranks on the main shaft, lateral shafts extending longitudinally of the machine and parallel to the main shaft and having crank arms operatively connected to the plungers, arms operatively connected each to one of said cranks on the main shaft, a crank arm on the main shaft operatively engaged with the presser foot, manually operable means for shifting said clutch, automatically operating means for shifting the clutch to disengage the driving wheel from the main shaft when the sliding trunk supporting member has been shifted toward the anvil a predetermined distance, and means actuated by the reciprocation of the plunger actuating said rivet transfer means to transfer rivets from the chutes to said rivet holders.

34. A riveting machine including an anvil, a guide bar extending rearward from the anvil, a slidable trunk supporting member mounted upon the guide bar for sliding movement, a power driven shaft, a bar carried by the sliding work support and extending rearward therefrom and having ratchet teeth on its opposite faces, a pawl carrier through which said ratchet toothed bar passes and having spring actuated pawls engaging opposite faces of the bar, means operatively connected to the shaft for reciprocating said carrier to thereby give a step by step motion to the trunk support, a spring actuated bevel toothed detent over which the ratchet toothed bar passes and which engages the ratchet teeth of the bar to prevent rearward movement, and means acting automatically when the trunk support has moved a predetermined distance toward the anvil lifting the pawls from engagement with the bar and rendering said pawls inactive and simultaneously shifting the detent from its engagement with the ratchet toothed bar to permit the trunk holder to be shifted rearward to its initial position.

35. A riveting machine including an anvil, a guide bar extending rearward from the anvil, a slidable trunk supporting member mounted upon the guide bar for sliding movement, a power driven shaft, a bar carried by the sliding work support and extending rearward therefrom and having ratchet teeth on its opposite faces, a pawl carrier through which said ratchet toothed bar passes and having spring actuated pawls engaging opposite faces of the bar, means operatively connected to the shaft for reciprocating said carrier to thereby give a step by step motion to the trunk support, a spring actuated bevel toothed detent over which the ratchet toothed bar passes and which engages the ratchet teeth of the bar to prevent rearward movement, a member mounted for sliding movement rearward of the pawl carrier and having blades extending through the pawl carrier, said member when reciprocated in one direction acting to lift the pawls from the ratchet teeth and render said pawls inoperative, a longitudinally extending stop shaft having an arm, a rock shaft actuated by the first named shaft and having operative engagement with said sliding member to shift it into engagement with the pawls upon a movement of the stop shaft in one direction and out of engagement with the pawls upon a movement of the stop shaft in the opposite direction, a spring actuated detent engaging the ratchet teeth of said bar to prevent retractive movement of the bar but permit its step by step forward movement, said detent being operatively engaged with said rock shaft whereby to cause a retraction of the detent upon a rocking of the rock shaft in a direction to advance said sliding member into engagement with the pawls, manually operable means connected to the shaft whereby it may be rocked, and means on the sliding trunk support for engaging the arm on the stop shaft to rock the shaft when the trunk support has moved into proximity to the anvil and thereby disconnect the pawls and detent from the ratchet toothed bar.

36. In a riveting mechanism, an anvil, a head supported above the anvil and having a vertically disposed recess located above the anvil, a presser foot reciprocating vertically in said recess toward and from the anvil, the lower end of the presser foot having oppositely disposed, outwardly and downwardly inclined faces and the side walls of said recess being cut away, riveting plungers disposed within said head and operating through said cut away portions and reciprocating toward and from the anvil, rivet holders mounted upon the head and each including a pair of spring pressed jaws disposed normally in front of the corresponding riveting plunger, rivet chutes extending downward through the head but out of line with said holders, laterally reciprocatable transfer members adapted, when shifted in one direction, to carry a rivet from the corresponding riveting chute to the corresponding rivet holder, means for reciprocating the plungers to force the rivets against the anvil and through the work, means for reciprocating the presser foot, means for operating said transfer members comprising a rock shaft mounted on the head and having arms operatively connected to the transfer bars, an arm on the rock shaft, and a link operatively connecting said arm to the presser foot whereby a reciprocation of the presser foot will cause an oscillation of the rock shaft and a consequent reciprocation of the transfer members.

37. In a riveting mechanism, an anvil, a head supported above the anvil and having a vertically disposed recess located above the anvil, a presser foot reciprocating vertically in said recess toward and from the anvil, the lower end of the presser foot having oppositely disposed, outwardly and downwardly inclined faces and the side walls of said recess being cut away, riveting plungers disposed within said head and operating through said cut away portions and reciprocating toward and from the anvil, rivet holders mounted upon the head and each including a pair of spring pressed jaws disposed normally in front of the corresponding riveting plunger, rivet chutes extending downward through the head but out of line with said holders, laterally reciprocatable transfer members adapted, when shifted in one direction, to carry a rivet from the corresponding riveting chute to the corresponding rivet holder, means for reciprocating the plungers to force the rivets against the anvil and through the work, means for reciprocating the presser foot, means for operating said transfer members comprising a rock shaft mounted on the head, resilient arms connected to the rock shaft at each end, then coiled and then extending downward and engaged with the transfer members whereby upon an oscillation of the rock shaft the transfer members will be reciprocated, and latches pivoted upon the head, the transfer members having notches into which said latches may engage to hold the transfer members from reciprocation.

38. A fastener inserting mechanism of the character described including a container support having an anvil formed with oppositely inclined faces, means for holding a container with its corner resting upon said anvil, means for automatically giving a step by step feeding motion in one direction to said container, means intermittently holding the container stationary, and power operated means for driving a pair of fasteners through the container and against the oppositely directed faces of the anvil while the container is stationary.

39. A fastener inserting mechanism of the character described including an anvil having oppositely inclined faces, a yieldably supported presserfoot recessed upon its under face to conform to the inclined faces of the anvil and having slots on each side of the recessed portion and extending over the inclined faces of the anvil when the presserfoot is depressed, fastener holders disposed on each side of the presserfoot adjacent the anvil, means for feeding fasteners one by one into said fastener holders, fastener inserting plungers acting upon a reciprocation in one direction to force the fasteners out of said holders and into the work against the anvil, and power operated means for depressing said foot and then operating said fastener inserting plungers.

40. A fastener inserting mechanism of the character described including an anvil having oppositely inclined faces, means for supporting work on said anvil, means for alternately shifting the work over the anvil and stopping the motion of the work, oppositely disposed fastener holders on each side of said anvil, means for feeding fasteners one by one to said fastener holders, means for simultaneously forcing the fasteners in both fastener holders into and through the work and against the anvil comprising oppositely disposed power operated fastener inserting plungers.

41. A fastener inserting mechanism of the character described including an anvil, a presserfoot disposed above the anvil, the anvil having oppositely inclined faces and the presserfoot being recessed to engage over said inclined faces and having lateral openings in its side walls, fastener supporting members disposed on each side of the anvil, means for feeding fasteners one by one into said fastener holders, oppositely disposed fastener inserting plungers reciprocable through said fastener holding means and toward and from the anvil, and power operated means for alternately shifting the work over the anvil and holding the work at rest, depressing said presserfoot when the work is at rest, depressing said fastener inserting plungers when the work is at rest, and raising said presserfoot and said fastener inserting plungers to permit the feeding movement of the work.

42. In a fastener inserting machine, a work supporting anvil, a vertically reciprocating presserfoot coacting therewith, oppositely disposed fastener holders disposed on each side of the anvil and directed toward the anvil and each including a pair of jaws resiliently urged toward each other, each fastener holder being mounted for longitudinal movement toward and from the anvil, a spring urging each fastener holder away from the anvil, means for feeding fasteners automatically to the fastener holders, a pair of fastener inserting plungers, each coacting with one of said fastener holders and reciprocable through said fastener holders and toward and from the anvil, when in engagement with the fastener and moving toward the anvil, carrying the fastener holder toward the anvil and upon a rearward movement permitting the reciprocation of the fastener holders, and power operated means for reciprocating the presserfoot, feeding fasteners to the fastener holders and reciprocating said fastener inserting plungers.

43. A fastener inserting mechanism including a fixed anvil having downwardly divergent side faces, means for supporting and feeding a trunk over said anvil with two of its walls disposed to engage the angular side faces of the anvil, fastener inserting mechanisms associated with the anvil and disposed above on each side thereof and extending at right angles to the inclined faces of the anvil, and power means for operating said fastener inserting mechanisms and giving a step by step movement to the trunk supported upon the anvil.

In testimony whereof we hereunto affix our signatures.

THOMAS M. HOUSE.
HARRY R. McCONNELL.